(12) United States Patent
Lee et al.

(10) Patent No.: US 6,811,590 B2
(45) Date of Patent: Nov. 2, 2004

(54) GAS CONCENTRATING METHOD AND APPARATUS USING PRESSURE SWING ADSORPTION

(75) Inventors: Tae Soo Lee, Gyonggi-do (KR); Yoon Sun Choi, Seoul (KR)

(73) Assignee: Oxus Co., Ltd., Seoul (KR)

( * ) Notice: Subject to any disclaimer, the term of this patent is extended or adjusted under 35 U.S.C. 154(b) by 0 days.

(21) Appl. No.: 10/411,229

(22) Filed: Apr. 11, 2003

(65) Prior Publication Data

US 2003/0192431 A1 Oct. 16, 2003

(30) Foreign Application Priority Data

Apr. 12, 2002 (KR) .................................. 10-2002-20176

(51) Int. Cl.$^7$ .......................................... B01D 53/047
(52) U.S. Cl. .............................. 95/98; 95/105; 95/130; 96/109; 96/115; 96/130
(58) Field of Search ........................... 95/98, 100, 103, 95/105, 130; 96/109, 115, 130

(56) References Cited

U.S. PATENT DOCUMENTS

| | | | | |
|---|---|---|---|---|
| 3,659,399 A | * | 5/1972 | Kauer et al. | 95/19 |
| 3,923,477 A | * | 12/1975 | Armond et al. | 95/103 |
| 4,348,213 A | * | 9/1982 | Armond | 95/103 |
| 4,349,357 A | * | 9/1982 | Russell | 95/26 |
| 4,376,640 A | * | 3/1983 | Vo | 95/26 |
| 4,917,710 A | * | 4/1990 | Haruna et al. | 95/102 |
| 4,925,461 A | * | 5/1990 | Gemba et al. | 95/98 |
| 5,108,467 A | * | 4/1992 | Schroter et al. | 95/103 |
| 5,137,549 A | * | 8/1992 | Stanford et al. | 95/98 |
| 5,183,483 A | * | 2/1993 | Servido et al. | 95/98 |
| 5,258,056 A | * | 11/1993 | Shirley et al. | 95/22 |
| 5,711,787 A | * | 1/1998 | Neill et al. | 95/96 |
| 5,858,063 A | * | 1/1999 | Cao et al. | 95/11 |
| 5,871,564 A | * | 2/1999 | McCombs | 95/98 |
| 6,077,331 A | * | 6/2000 | Phillips | 95/12 |
| 6,514,319 B2 | * | 2/2003 | Keefer et al. | 95/101 |
| 6,527,830 B1 | * | 3/2003 | Neu et al. | 95/98 |
| 2002/0029691 A1 | * | 3/2002 | McCombs et al. | 95/96 |
| 2002/0121193 A1 | * | 9/2002 | Baksh et al. | 95/96 |

FOREIGN PATENT DOCUMENTS

EP           0609620 A1  *  8/1994

* cited by examiner

Primary Examiner—Robert H. Spitzer
(74) Attorney, Agent, or Firm—Liniak, Berenato & White, LLC

(57) ABSTRACT

A gas concentrating method and apparatus is provided in which equalization is accomplished below two sieve beds, to thereby save compression energy, to reduce exit noise, and to obtain a gas whose gas purity with respect to an amount of flow has been enhanced. The gas concentrating method makes two sieve beds communicate with each other at their bottoms when a pressure difference between a pressurized pressure and a decompressed pressure is maximized in the multi-bed type sieve beds which alternately operate between pressurization and decompression, to equalize an internal pressure in the sieve beds. The gas concentrating apparatus includes a compressor (50), sieve beds (60-1, 60-2), solenoid valves (40-1, 40-2), an orifice (90), check valves (90-1, 90-2), a storage tank (100), a pressure controller (70), a flow meter (80), a controller (110), and a muffler (20).

20 Claims, 8 Drawing Sheets

Prior Art

Prior Art

GAS CONCENTRATING METHOD AND APPARATUS USING PRESSURE SWING ADSORPTION

CROSS REFERENCE TO RELATED APPLICATION

Applicant claims priority to Korean patent application 2002-0020176 filed Apr. 12, 2002.

BACKGROUND OF THE INVENTION

1. Field of Invention

The present invention relates to a gas concentrating method and apparatus using pressure swing adsorption (PSA), and more particularly, to a gas concentrating method and apparatus in which a high-pressure gas concentration is performed in a system (which means a two-adsorption-bed system, which is hereinafter referred to as a multi-bed system) where two adsorption beds (hereinafter referred to as sieve beds) alternately repeat concentration of a weak adsorption matter and washing of a strong adsorption matter, and then the two sieve beds are made to temporarily communicate with each other through a solenoid valve, at their bottoms, in such a manner that a high-pressure raw material gas moves from a high-pressure sieve bed to a low-pressure sieve bed to thus equalize pressures in the two sieve beds and perform washing and discharging of the two sieve beds.

2. Description of the Related Art

A pressure swing adsorption (PSA) process separates and concentrates a gas such as oxygen using a difference in an adsorption quantity of oxygen adsorbed to an adsorption material according to a pressure. Since the PSA process uses only compressed air and an adsorption material, it does not discharge a pollution matter and its use is easy. Thus, the PSA process has been widely used in a medical oxygen concentrator for long.

According to a concentrating principle, when compressed air is introduced and pressurized in a sieve bed filled with an adsorption material, a strong adsorption matter is adsorbed and a weak adsorption matter is concentrated. As a result, oxygen is left and separately stored as a product gas. After the product gas has been obtained, the strong adsorption matter adsorbed to the adsorption material is detached as inner oxygen and discharged externally to then be decompressed.

According to an oxygen separation principle, two sieve beds perform the above-described concentrating steps alternately. That is, the oxygen separation process includes four steps. Here, oxygen, which is a weak adsorption matter, is separated from a massive amount of nitrogen, which is a strong adsorption matter, in the sieve beds including zeolite which is an adsorption material.

Nitrogen of about 80% consisted in the air is adsorbed to zeolite more than oxygen be. Accordingly, when air is introduced in a sieve bed filled with an adsorption material, nitrogen is adsorbed to the adsorption material and oxygen in the air from which nitrogen has been reduced rises up to an exit located in the upper end of the sieve bed. The main component of the risen oxygen is composed of concentrated oxygen which is -a weak adsorption matter.

The above-described two-sieve-bed type, that is, multi-bed type oxygen separating apparatus is used as an oxygen separator. The oxygen separator includes an adsorption unit for separating nitrogen and oxygen from the air, an operator performing compression, storage and discharging of the air, a controller turning a valve on and off, and a frame portion accommodating the adsorption unit, the operator and the controller.

The oxygen separating apparatus adopts an oxygen separation method of repeating a process of supplying compressed air to a sieve bed filled with an adsorption material and adsorbing oxygen, and a process of detaching the oxygen adsorbed to the adsorption material, to thereby obtain necessary oxygen of a predetermined concentration. Here, part of the necessary oxygen obtained in the sieve bed is circulated into the sieve bed in order to perform a detachment process.

The adsorption process includes the steps of introducing compressed air through a predetermined adsorption material, adsorbing nitrogen which is a strong adsorption matter, and separating oxygen from the air. Here, once an adsorption step has been performed, the nitrogen adsorbed to zeolite which is an adsorption material should be necessarily separated (detached) from the adsorption material, in order to restore the original performance. This process is called a washing process, in which part of the oxygen adsorbed to the adsorption material is recirculated under a low-pressure state and detached therefrom, to restore an adsorption performance.

As described above, oxygen concentration and nitrogen washing are repeated to obtain concentrated oxygen of a predetermined purity.

An oxygen concentrating apparatus for concentrating oxygen through a multiple-bed type sieve bed was filed by the same applicant as shown in FIG. 1.

The oxygen concentrating apparatus includes a compressor 50 for compressing air, a solenoid valve 40 for controlling a supply of the compressed air, sieve beds 60-1 and 60-2 for separating nitrogen and oxygen from the compressed air supplied through the solenoid valve 40, an orifice 90 connected between the upper portions of the two sieve beds, an equilibrium valve 120 installed between the two sieve beds, making high-pressure and high-purity oxygen flow from the upper portion of the sieve bed to that of the other sieve bed, to be in equilibrium, counter-current preventive check valves 90-1 and 90-2, a storage tank 100, a pressure controller 70 and a needle valve 80. In FIG. 1, a reference numeral 10 denotes an air intake filter, a reference numeral 20 denotes an air intake muffler, and a reference numeral 30 denotes an air discharging muffler.

When the inner portion of a first sieve bed 60-1 is pressurized with the air, in the oxygen concentrating apparatus, nitrogen is adsorbed to an adsorption material from the air, and the other remaining concentrated oxygen is discharged. At the same time, in the case of a second sieve bed 60-2, an adsorption material to which nitrogen is adsorbed should be washed. Accordingly, part of the concentrated oxygen in the first sieve bed 60-1 is transferred to the upper portion of the second sieve bed 60-2 through an orifice 90 to then wash the inside of the second sieve bed 60-2. Then, oxygen of a high-pressure and high-purity is transferred to the second sieve bed 60-2 for a short time to keep the oxygen concentration in equilibrium between the first and second sieve beds and discharge the internal gas after washing. Here, the internal portion of the second sieve bed 60-2 has a considerable pressure resistivity.

Thus, in the case of the oxygen concentrating system, a compressor continues to operate at high pressure in the first sieve bed and a pressurized concentrated oxygen at high pressure is supplied to the inside of the second sieve bed which is at the low-pressure state through an equilibrium valve. As a result, the above-described oxygen concentrating system has the following defectives.

First, since the second sieve bed is washed with a high-purity of concentrated oxygen, a mechanical energy loss becomes large due to pressurization of a compressor.

Second, when the concentrated oxygen of a high pressure is supplied from the upper portion of the first sieve bed into the inside of the second sieve bed which is at the low-pressure state after pressurization, the second sieve bed is kept to be at the high-pressure state while discharging the air. As a result, air discharging noise becomes excessive.

Referring to FIG. 2 illustrating the above-described processes, according to a pressure curve of the first sieve bed, the pressure rises up to the point immediately before the concentrated oxygen in the first sieve bed is discharged, and then part of the high-pressure oxygen is supplied to the second sieve bed through the equilibrium valve 120, so that the pressure is lowered from 2.5 to 1 during about 2 seconds, which is shown as a pressure difference between ① and ② in FIG. 2. Here, the pressure equilibrium is made between both the sieve beds, and the second sieve bed is partially pressurized.

Thereafter, since a time between an intersection at which the pressure curves of the respective sieve beds cross (at a point at which the pressure is 1.5 as shown in ③ in FIG. 2) and the maximum pressure rise-up point of the first sieve bed becomes longer from about 100 seconds to 127 seconds by about 27 seconds, a mechanical energy necessary for operation of the compressor for generating compressed air is increased.

Also, the pressure is 2.5 at the time of equalization of the pressure between the first and second sieve beds, which causes noise to occur during discharging.

That is, the PSA process in the conventional multi-bed type system performs an equilibrium process through the upper portion of the sieve bed in order to heighten an efficiency, in which the high-pressure raw material oxygen is supplied from the upper portion of the high-pressure sieve bed to the low-pressure sieve bed and used as washing and pressure equilibrium. As a result, since the high-pressure and high-purity raw material oxygen produced in the upper portion of the first sieve bed is supplied to the second sieve bed as the oxygen for washing, the mechanical energy of the compressor needed during compressing the oxygen is lost.

In general, most of the energy used in an oxygen generator is an operational mechanical energy of an air compressor. That is, although the mechanical energy used for pressurizing the air is used for separating the oxygen from the air in the inside of a sieve bed, part of the mechanical energy is lost since oxygen is discharged through the air during washing.

However, in the case that the sieve beds communicate with each other at their bottoms not their tops, to thereby transfer the raw material oxygen, the compressed oxygen located at the bottom of the high-pressure sieve bed can be used for pressurizing the lower pressure sieve bed as the pressurization oxygen which is not the high-purity concentrated oxygen. As a result, the mechanical energy can be considerably restored.

SUMMARY OF THE INVENTION

To solve the above problems in the gas concentration and washing method of the conventional gas concentrator, it is an object of the present invention to provide a method of pressurizing, washing and discharging a low-pressure sieve bed with a high-pressure gas remaining at the bottom of a high-pressure sieve bed during a pressure equilibrium process after obtaining a production gas.

It is another object of the present invention to provide a gas concentrating method of reducing noise of a discharging gas at a low-pressure side, in which a pressure equilibrium time between two sieve beds is shortened during gas concentrating and washing processes, to thereby obtain an energy reduction effect in operation of a compressor, and perform washing and discharging at a lower pressure.

It is still another object of the present invention to provide a gas concentrating apparatus adopting a pressure swing adsorption system using a low purity high-pressure gas at the bottoms of sieve beds under the control of each solenoid valve, in which an equilibrium valve installed between the upper portions of the conventional gas concentrating apparatus for performing a pressure equilibrium is removed and a solenoid valve is installed for perform a pressure equilibrium at the bottom of each sieve bed.

Accordingly, the valves connected in a complicated way on the tops of the sieve beds are removed to thereby simplify the whole structure.

To accomplish the above object of the present invention, there is provided a gas concentrating method of keeping pressures in equilibrium through the bottoms of two sieve beds when a pressure difference between a pressurized pressure and a decompressed pressure is maximized in a multi-bed type sieve bed which operates alternately between pressurization and decompression. Here, for the purpose of achieving the pressure equilibrium through the bottoms of the sieve beds, the pressurization time is shortened by pressurizing the high-pressure gas at high-purity in the first sieve bed to thereby reduce the pressurized energy, and discharge the washing gas at a lower pressure in the second sieve bed.

According to another aspect of the present invention, there is also provided a gas concentrating apparatus using pressure swing adsorption (PSA), the gas concentrating apparatus comprising: an air intake filter for filtering the air in the atmosphere; a compressor; two sieve beds for adsorbing nitrogen; an orifice for assisting washing of the sieve beds and obtaining high-purity gas; check valves for preventing an inverse flow of the gas; a storage tank for keeping the purity of the gas to be constant and reducing change of the discharged flow amount; a pressure controller for maintaining the pressure of the discharged gas at a low pressure; a flow meter for supplying a predetermined amount of gas; a muffler for preventing noise of the discharged gas after washing; a 3/2 solenoid valve installed on the bottom of each sieve bed in order to achieve pressure equilibrium using the discharged air and recollect the mechanical energy; and a controller for controlling the solenoid valves and compressor to be turned on and off.

The gas concentrating apparatus using the PSA uses preferably a 3-port 2-way solenoid valve as each of the first and second solenoid valves.

The gas concentrating apparatus according to the present invention does not use high-purity oxygen for nitrogen washing and discharging but uses low-pressure oxygen at the closing stage of the pressurization in either sieve bed, in a gas concentrating method of a multi-bed type using two sieve beds in which a first sieve bed performs concentration and a second sieve bed performs washing and discharging, and then repeats the concentration and washing alternately.

BRIEF DESCRIPTION OF THE DRAWINGS

The above objects and other advantages of the present invention will become more apparent by describing the preferred embodiments thereof in more detail with reference to the accompanying drawings in which.

DETAILED DESCRIPTION OF THE INVENTION

A preferred embodiment of the present invention will be described in detail with reference to the accompanying drawings.

Prior to describing a control method according to the present invention, an oxygen concentrating apparatus embodying a control method in an oxygen concentrating apparatus according to the present invention will be described.

Figure 1:
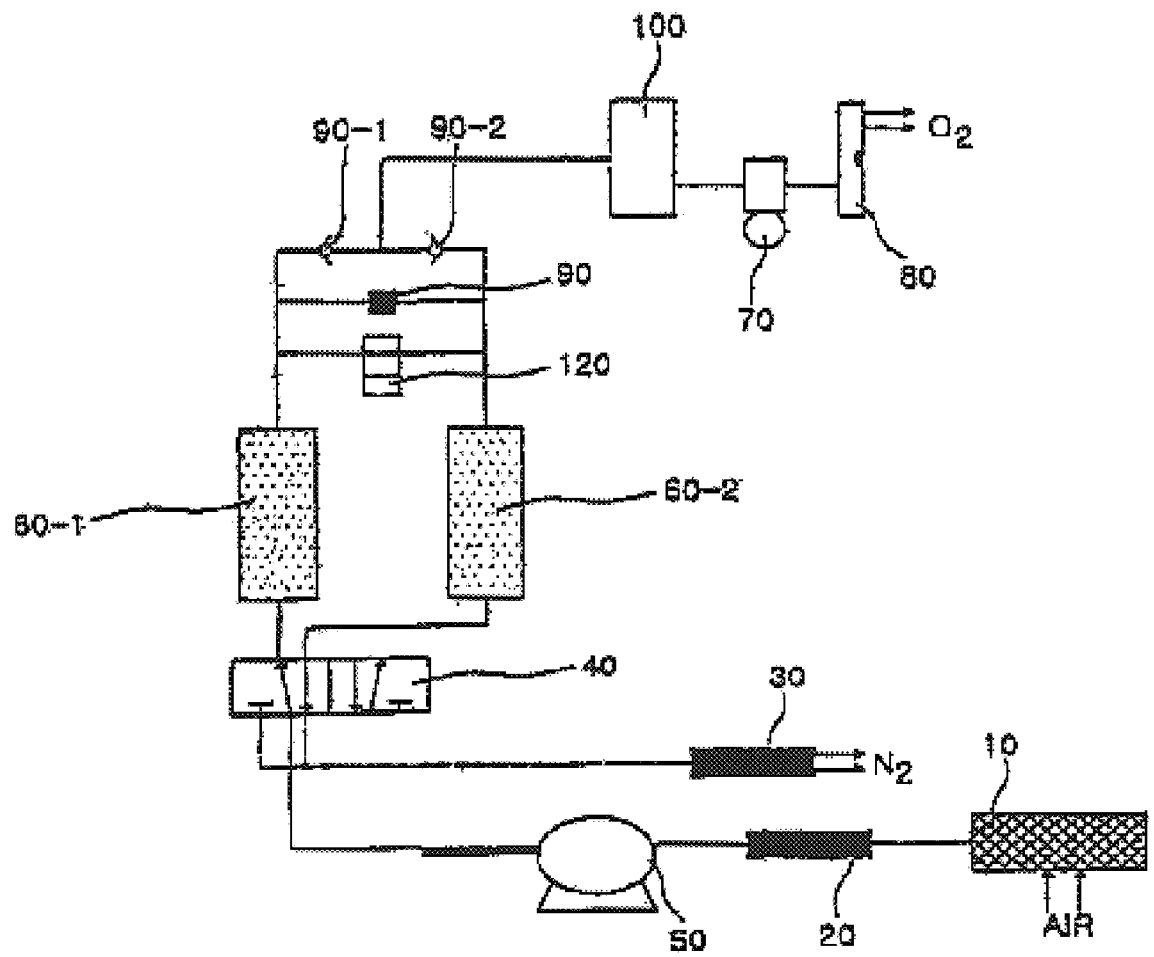
FIG. 1 is a configuration diagram showing an example of an apparatus performing a conventional oxygen concentrating method.
Figure 2:
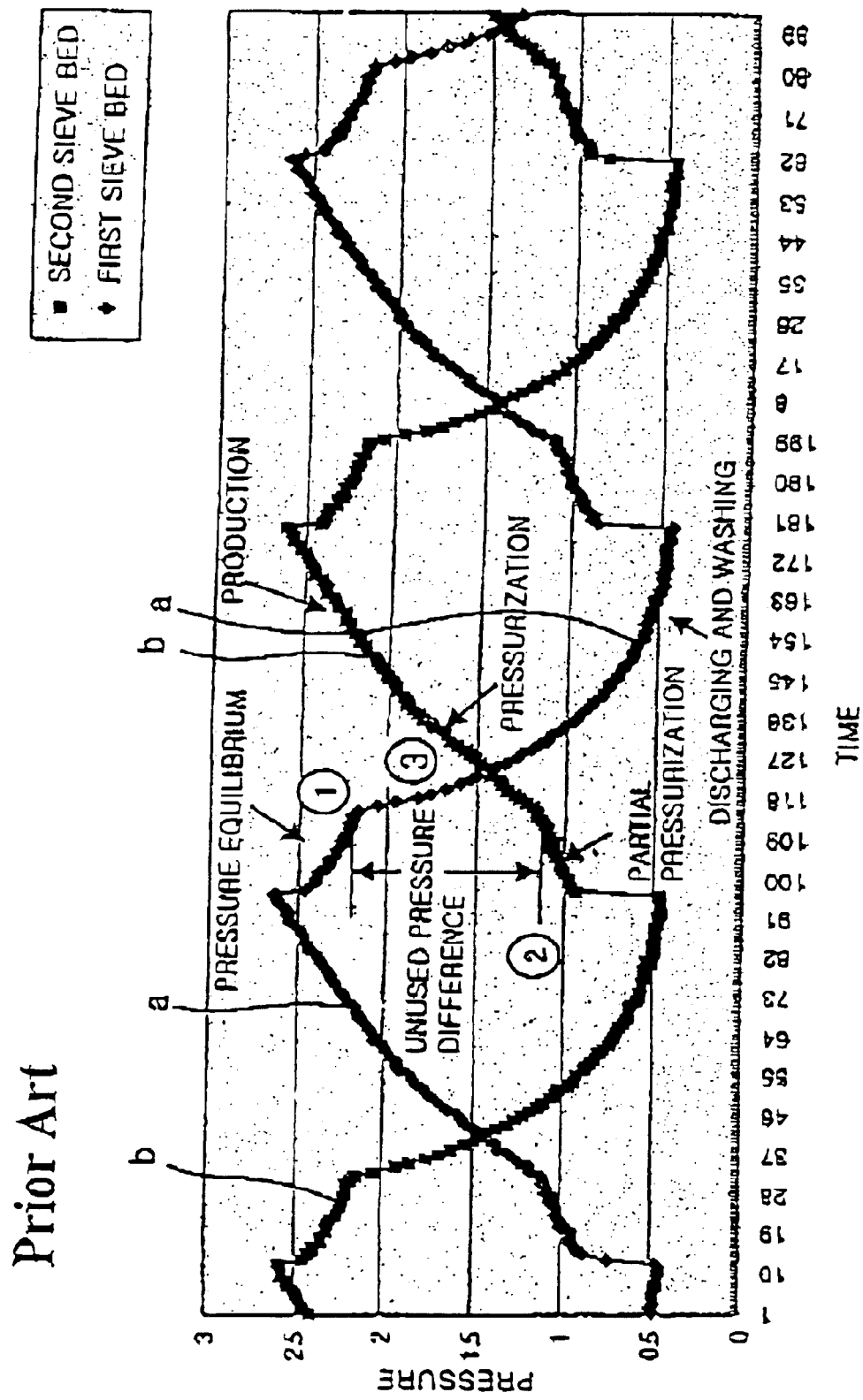
FIG. 2 is a graphical view showing a pressure variation process of a conventional oxygen concentrating method.
Figure 3:
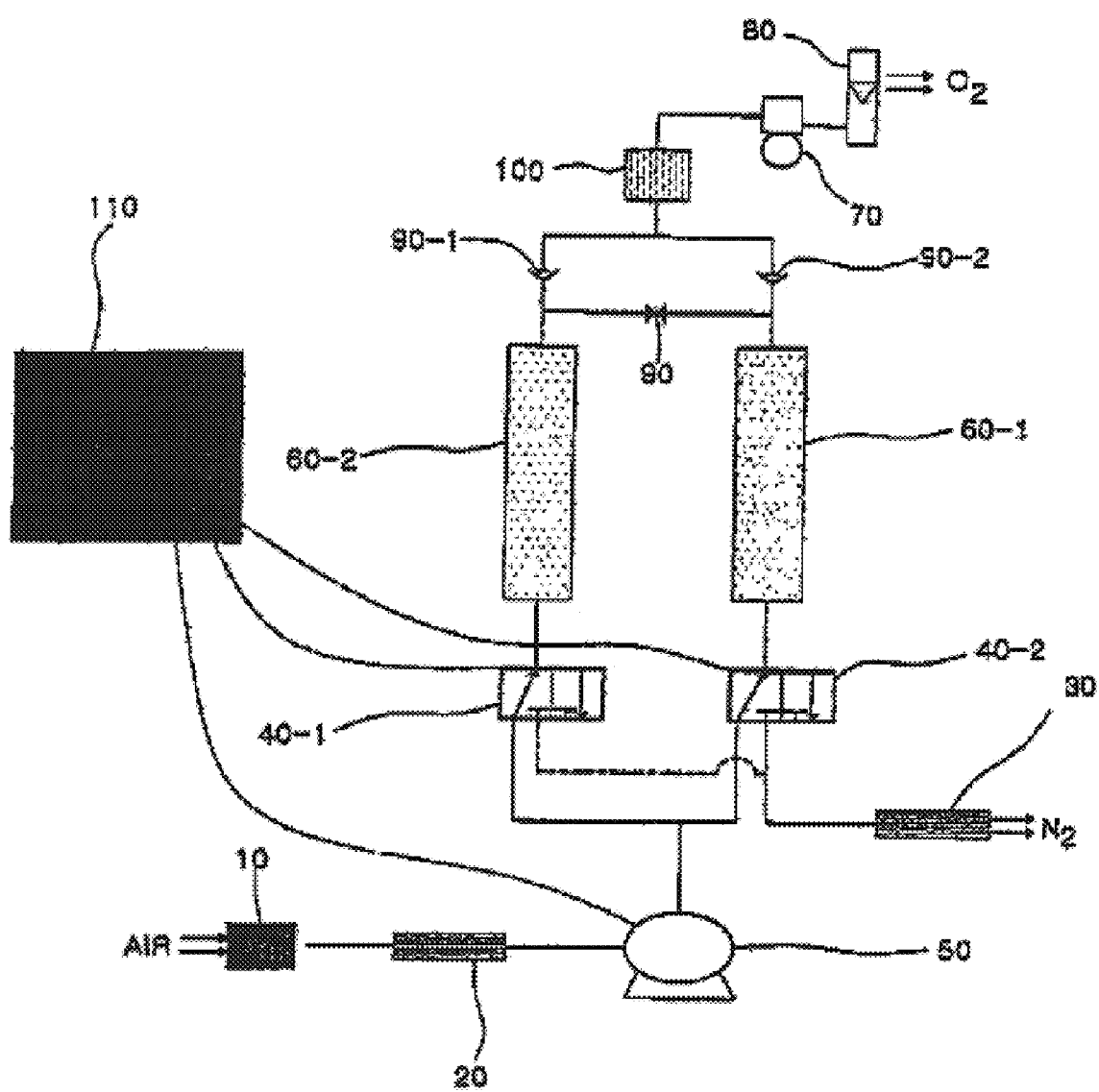
FIG. 3 is a configuration diagram showing an apparatus for performing an oxygen concentrating method according to an embodiment of the present invention.

The oxygen concentrating apparatus according to the present invention includes an air intake filter 10 installed at the entrance for filtering the air, a muffler 20 for preventing noise during sucking the air, a compressor 50 for compressing the air up to a predetermined pressure, two sieve beds 60-1 and 60-2 connected with two branch lines in order to distribute the air compressed in the compressor 50 alternately, for adsorbing nitrogen with a predetermined nitrogen adsorption material embedded therein, a pressure controller or regulator 70 for maintaining the pressure of the discharged concentrated oxygen to be at a low pressure, a flow meter or needle valve 80 for supplying a predetermined amount of concentrated oxygen, 3/2 solenoid valves 40-1 and 40-2 installed on the bottom of each sieve bed 60-1 or 60-2 in order to achieve pressure equilibrium using the discharged air and recollect the mechanical energy, and a controller 110 for controlling the solenoid valves and compressor to be turned on and off. In FIG. 3, a reference numeral 100 denotes a storage tank, reference numerals 90-1 and 90-2 denote counter-current preventive check valves, a reference numeral 90 denotes an equilibrium valve, and a reference numeral 30 denotes air discharging muffler.

As shown in FIGS. 3 through 5C, an oxygen concentrating process according to the present invention will be described below.

First Process

Figure 5A:
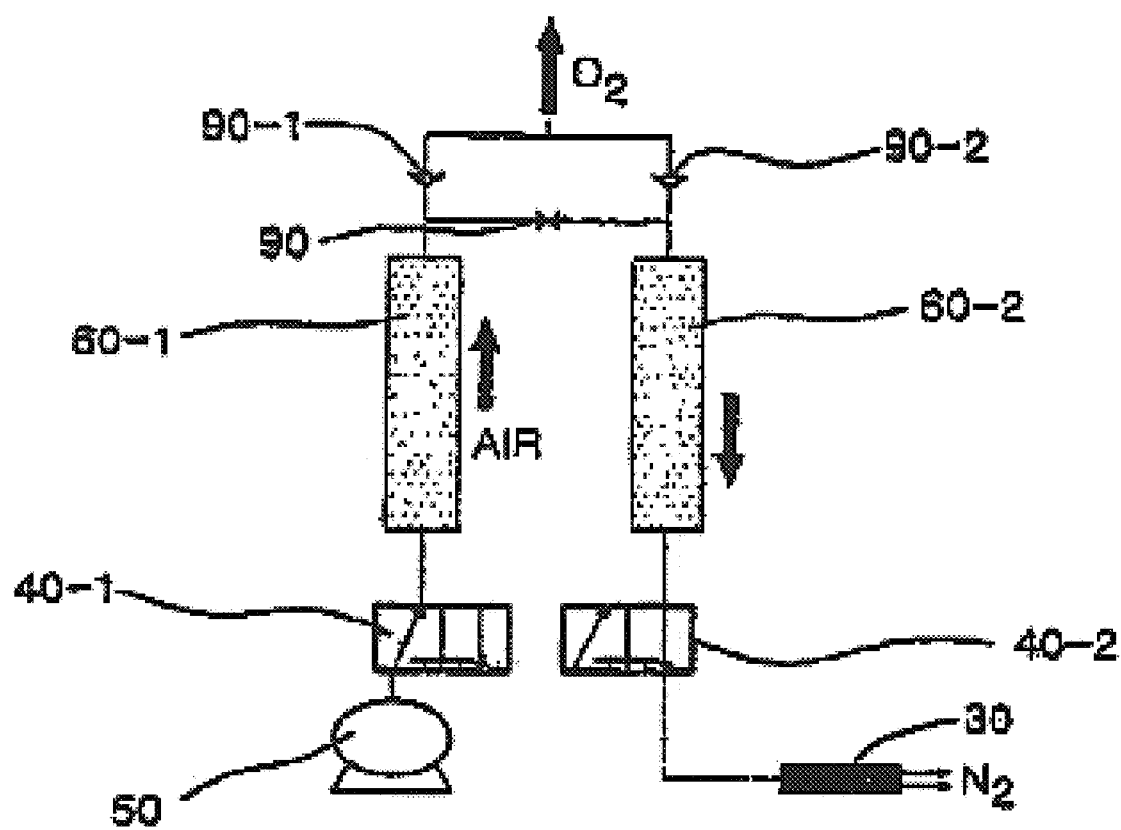
FIGS. 5A, 5B and 5C are schematic diagrams which illustrate stepwise a pressure variation process of the oxygen concentrating method according to the present invention.

As shown in FIG. 5A, external air is pressurized and supplied to a first sieve bed 60-1 through an air intake filter 10, an air intake muffler 20 and a compressor 50.

The air pressurized through the intake filter 10, the air intake muffler 20 and the compressor 50 is pressurized and adsorbed in the first sieve bed 60-1 through a first solenoid valve 40-1

Figure 4:
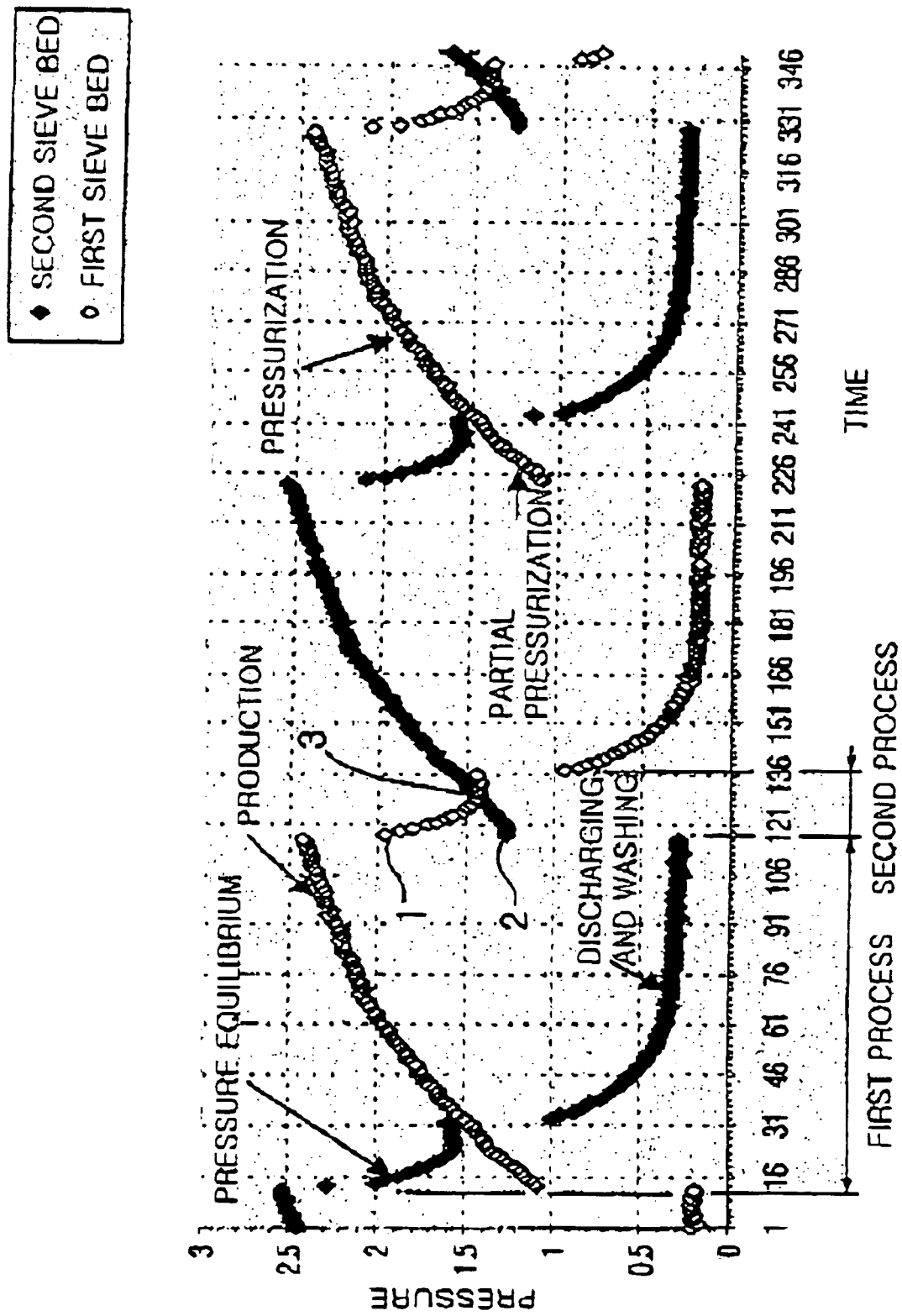
FIG. 4 is a graphical view showing a pressure variation process of an oxygen concentrating method according to the present invention.

Here, as shown in FIG. 4, the second sieve bed 60-2 receives part of the high-pressure oxygen through an orifice to wash the adsorption material with the high-pressure oxygen, and opens the solenoid valve 40-2 to discharge the oxygen through the muffler 30.

Second Process

Figure 5B:
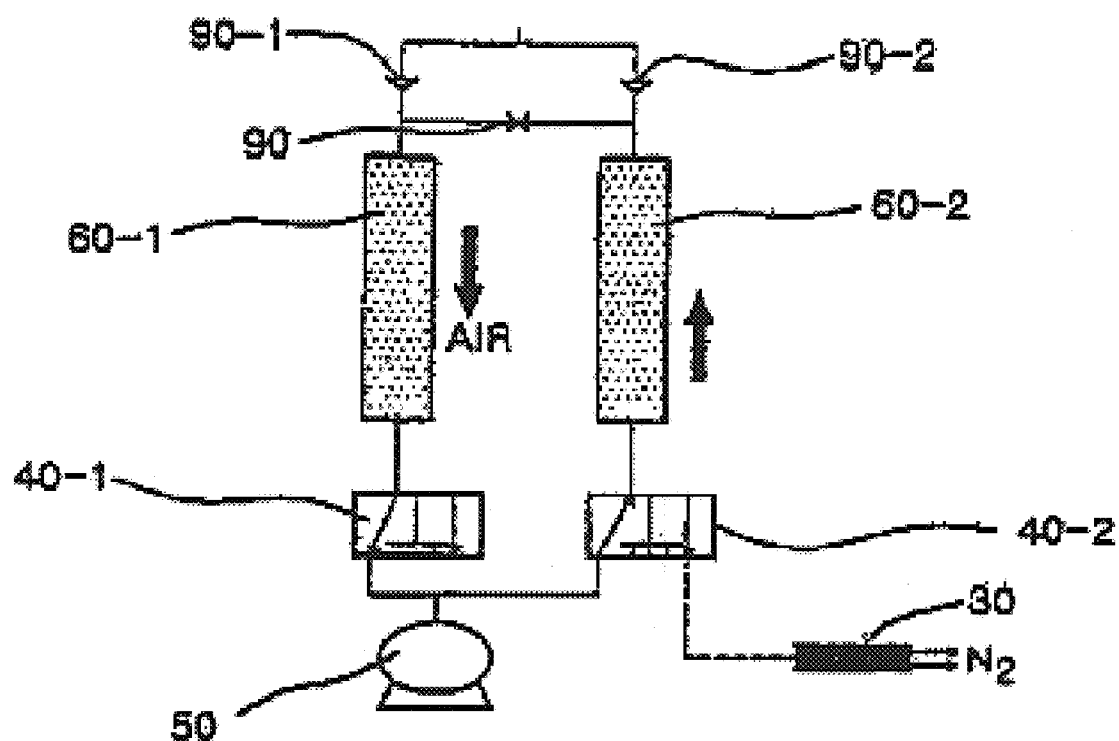

As shown in FIG. 5B, concentration (pressurization) proceeds in the first sieve bed 601 for a predetermined time, to extract a production gas, and then the first and second sieve beds 60-1 and 60-2 open the first and second solenoid valves 40-1 and 40-2 simultaneously to communicate with each other at their bottoms.

When the solenoid valves 40-1 and 40-2 are opened so that the sieve beds 60-1 and 602 communicate with each other at their bottoms, the high-pressure oxygen in the first sieve bed 60-1 counter-flows into the second sieve bed 60-2 instantaneously so that the pressures in both the sieve beds 60-1 and 60-2 equal instantaneously. This state is indicated as a pressure equilibrium point 3 as shown in FIG. 4.

Then, the second sieve bed 60-2 which is at the low pressure is pressurized through operation of a compressor after about seven seconds. Accordingly, the pressurized oxygen starts to be concentrated. Simultaneously, the first sieve bed 60-1 performs washing and discharging.

Thus, it takes about only seven seconds from the pressurization time start point in time 3 to the termination of the pressure curve in the first sieve bed, so that the operation of the compressor is linked with a pressurization operation of the second sieve bed at once. However, in the conventional art, after the compressor operates for a considerable time, e. g. for about 27 seconds between the closing time of the pressure curve in the first sieve bed 60-1 and the equilibrium point 3, the second sieve bed starts a pressurization operation at a pressure of 1.5, which causes an unnecessary operation of the compressor.

Also, since the equilibrium pressure in the second sieve bed is kept at 2.0, in order to be lowered by 0.5 than 2.5 of the conventional case, noise is reduced during discharging.

Third Process

Figure 5C:
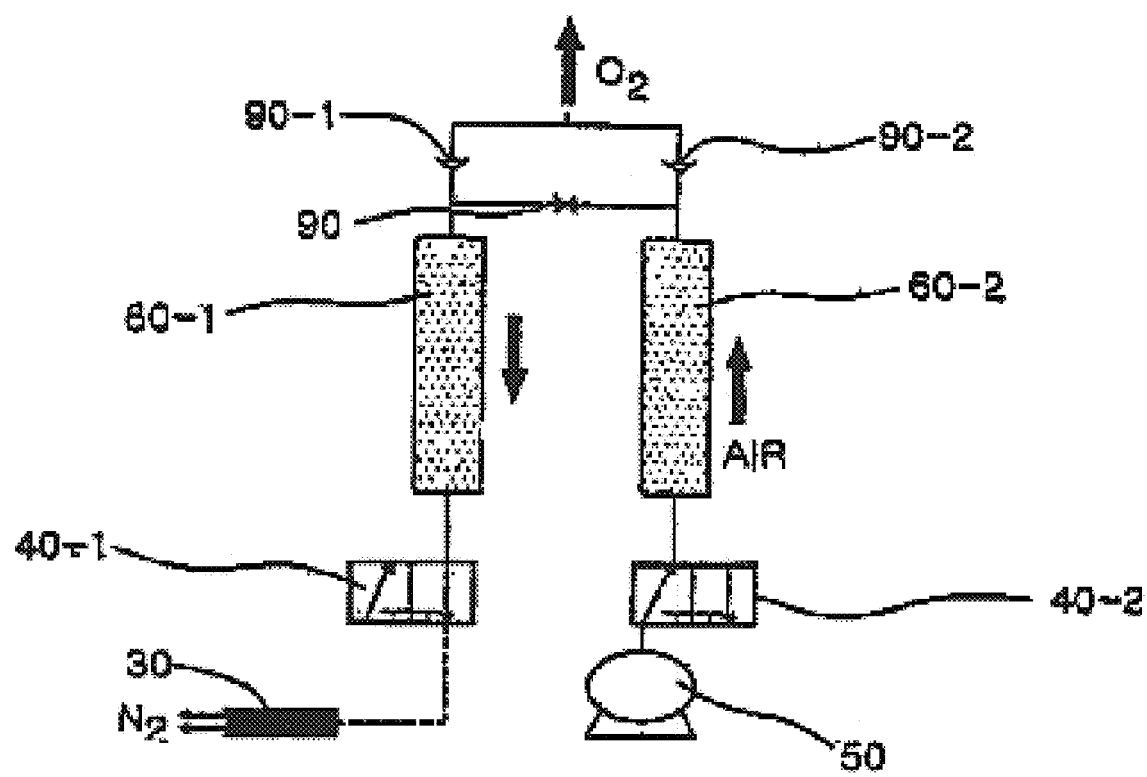

As shown in FIG. 5C, external air is pressurized and supplied to the second sieve bed 60-2 through the air intake filter 10, the air intake muffler 20 and the compressor 50.

The air pressurized through the intake filter 10, the air intake muffler 20 and the compressor 50 is pressurized and adsorbed in the second sieve bed 60-2 through a second solenoid valve 40-2.

Here, as shown in FIG. 4, the first sieve bed 60-1 receives part of the high-pressure oxygen through the orifice to wash the adsorption material with the high-pressure oxygen, and opens the solenoid valve 40-1 to discharge the oxygen through the muffler 30.

Thereafter, the above-described second process proceeds and performs each process alternately.

Since the present invention can reduce a mechanical energy loss, it is possible to develope a lower power oxygen concentrator. For example, in the case of a power consumption amount in order to acquire a purity of 90% in 5LPM which is used frequently, a power of 460 W is consumed in the existing 6-step system. Meanwhile, the present invention can produce oxygen with a power of 380 W.

Meanwhile, the present invention can apply the same method to an independent rinse and storage (IRS) type independent concentrating apparatus in which IRS type includes a storage tank, check valve, and orifice in an adsorption case.

Figure 6:
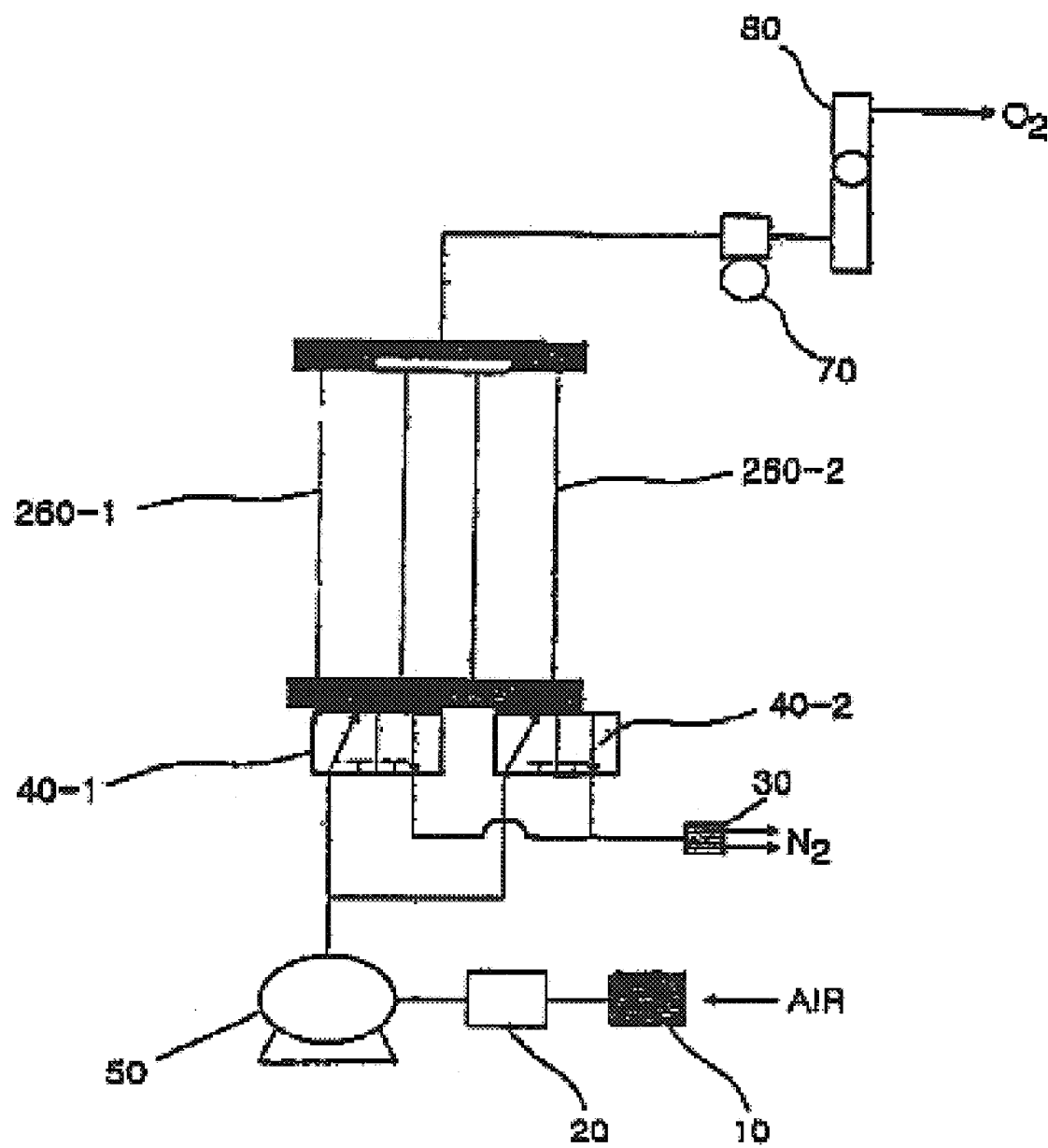
FIG. 6 is a configuration diagram showing a single-bed type oxygen concentrating apparatus in which an oxygen concentrating method according to the present invention is embodied.

The operation of the oxygen concentrating apparatus will be described with reference to FIG. 6.

That is, the external air is pressurized through an air intake filter 10, an air intake muffler 20 and a compressor 50, and supplied to a first sieve bed 260-1 through a first solenoid valve 40-1.

The air pressurized through the intake filter 10, the air intake muffler 20 and the compressor 50 is pressurized and adsorbed in the first sieve bed 260-1 through the first solenoid valve 40-1.

Here, the second sieve bed 260-2 performs washing and discharging with the high-pressure concentrated oxygen.

After concentration (pressurization) proceeds in the first sieve bed 260-1 for a predetermined time, to extract production oxygen, and then the first and second sieve beds 260-1 and 260-2 open the first and second solenoid valves 40-1 and 40-2 simultaneously to communicate with each other at their bottoms of the first and second sieve beds 260-1 and 260-2.

When the solenoid valves 40-1 and 40-2 are opened so that the sieve beds 260-1 and 260-2 communicate with each other at their bottoms, the high-pressure pressurized oxygen in the first sieve bed 260-1 counter-flows into the second sieve bed 260-2 instantaneously so that the pressures in both the sieve beds 260-1 and 260-2 equal instantaneously. Then, the second sieve bed receives the compressed air from the compressor to start a new pressurization operation.

As described above, the oxygen concentrating method using a PSA process according to the present invention can obtain two kinds of effects in the case that it is used for a multi-bed type oxygen concentrating method, which can be obtained in both a high-pressure sieve bed and a low-pressure sieve bed.

First, the sieve bed which becomes at a low pressure after washing, greatly shortens a time taken from the high-pressure sieve bed to the equilibrium point, before being pressurized up to a pressure at which re-adsorption can be accomplished, and controls the compressor to operate. Accordingly, the present invention can obtain an effect of saving the energy in comparison with the existing PSA process.

Second, during the time when a sieve bed of a high-pressure concentrates raw material oxygen, a low-pressure sieve bed is linked to perform washing and discharging. Accordingly, the oxygen is discharged at a lower pressure to thereby reduce discharging noise.

Also, the upper portions of the sieve beds discharges only high concentrated oxygen. In the conventional case, part of the oxygen is counter-flows through the upper portions of the sieve beds to be kept in equilibrium, and thus loses part of the produced oxygen. However, the present invention performs production of the raw material oxygen through the upper portions of the sieve beds continuously. As a result, the present invention can obtain oxygen whose purity is enhanced in a flow to oxygen purity although a compressor operates at a compression energy dependent upon a mechanical operation during compression under the lower power consumption.

As described above, the present invention is applied to a 3-way 2-port solenoid valve including an orifice, a check valve and an oxygen storage tank, as well as the 3-port 2-way solenoid valve, to thereby reduce compression energy and noise generation.

The present invention is not limited in the above-described embodiments. It is apparent to one who is skilled in the art that there are many variations and modifications without departing off the spirit of the present invention and the scope of the appended claims.

What is claimed is:

1. A gas concentrating method using pressure swing adsorption in which external air pressurized and supplied through an air intake filter, an air intake muffler and an air compressor, and the pressurized air is circulated and adsorbed, to thereby concentrate a gas, the gas concentrating method comprising the steps of:

communicating gas between a first valve installed at a bottom of a pressurized sieve bed and a second valve installed at a bottom of a depressurized sieve bed, and thereby establishing pressure equilibrium between the sieve beds when a pressure difference between the pressurized sieve bed and the depressurized sieve bed exceeds a pre-determined maximum threshold.

2. A pressure swing adsorption method of concentrating a product gas, comprising the steps of:

compressing intake air, providing the compressed air to a first sieve bed, concentrating a product gas in the compressed air in the first sieve bed, opening a first valve at a bottom of the first sieve bed, flowing product wash gas from the first valve through a second valve at a bottom of a second sieve bed and into the second sieve bed, washing the second sieve bed with the wash gas, ejecting a mixed waste gas comprising a product wash gas from the second sieve bed through said second valve.

3. The method described in claim 2, further comprising:

closing a second valve exhaust port, piping the compressed air into the second sieve bed, concentrating the product gas in the second sieve bed, opening the second valve, flowing a product wash gas from the second sieve bed, through the second valve, through the first valve, and into the first sieve bed, establishing a pressure equilibrium between the bottom of the first sieve bed and the bottom of the second sieve bed, washing the first sieve bed with the product wash gas, ejecting a mixed waste gas containing said product gas from said first sieve bed through said first valve.

4. The method of claim 2, wherein, after the flowing step and before the washing step, pressure equilibrium is established between the bottom of said first sieve bed and the bottom of said second sieve bed.

5. The method of claim 2 wherein said air flows through an air filter and a muffler before the compressing step, and waste gas is discharged through a muffler after the ejecting step.

6. The method of claim 2 wherein the first valve and the second valve are solenoid valves.

7. The method of claim 6 wherein the first valve, the second valve, and a compressor are operated by a controller so that pressure equilibrium between the first sieve bed and the second sieve bed is achieved.

8. The method of claim 2 wherein the first and second valves are one of 3 port 2 way solenoid valves or 2 port 3 way solenoid valves.

9. The method of claim 2 further comprising, producing the product gas from a top of the first sieve bed after said concentrating step, flowing the produced gas through a check valve, collecting said produced gas in a storage tank, maintaining the storage tank pressure by a pressure regulator, flowing the produced gas through the pressure regulator and a needle valve.

10. The method of claim 9 wherein said produced gas is oxygen.

11. The method of claim 10 wherein said produced gas has a higher oxygen content than said product wash gas.

12. A gas concentrating apparatus using pressure swing adsorption, the gas concentrating apparatus comprising:

an air intake filter (10) for filtering the air in the atmosphere;

a compressor (50);

two sieve beds (60-1, 60-2) for adsorbing nitrogen;

an orifice (90) for assisting washing of the sieve beds and obtaining high-purity gas;

check valves (90-1, 90-2) for preventing an inverse flow of the gas;

a storage (100) tank for keeping the purity of the gas to be constant and reducing change of the discharged flow amount;

a pressure controller (70) for maintaining the pressure of the discharged gas at a low pressure;

a flow meter (80) for supplying a predetermined amount of gas;

a muffler (20) for preventing noise of the discharged gas after washing;

a solenoid valve (40-1, 40-2) installed on the bottom of each sieve bed in order to achieve pressure equilibrium using the discharged air to recover the mechanical energy; and a controller (110) for controlling the solenoid valves and compressor to be turned on and off.

13. The gas concentrating apparatus using the pressure swing adsorption system of claim 12, wherein one of a 3-port 2-way solenoid valve or a 2-port 3-way solenoid valve is used as each of the solenoid valves.

14. A pressure swing adsorption apparatus comprising, an air inlet, a compressor communicating with said air inlet, first and second controllable valves, each of said first and second valves being connected in series with said compressor, first and second sieve beds, each of said first and second sieve beds having a top end and a bottom end, said first sieve bed bottom end communicating with said first valve, said second sieve bed bottom end communicating with said second valve, whereby said first sieve bed supplies a product wash gas through said first valve, through said second valve, and into said second sieve bed, a waste gas comprising said product wash gas being exhausted through said second valve.

15. The apparatus as described in claim 14 wherein a controller is connected to a compressor and to said first and second valves so that an equilibrium condition is established between said first sieve bed and said second sieve bed.

16. The apparatus as described in claim 14 wherein said first valve is connected in series with said second valve.

17. The apparatus as described in claim 14 further comprising an air inlet filter and an air inlet muffler.

18. The apparatus as described in claim 14 wherein said first and second valves are one of 3 port 2 way solenoid valves or 2 port 3 way solenoid valves.

19. The apparatus as described in claim 14 wherein each of said first and second valves is connected in series with an exhaust muffler.

20. The apparatus described in claim 14 wherein said first and second sieve beds are comprised of zeolite adsorption material.

* * * * *